US007140409B2

(12) United States Patent
Leberfinger et al.

(10) Patent No.: US 7,140,409 B2
(45) Date of Patent: Nov. 28, 2006

(54) PORTABLE PIPE CUTTING APPARATUS

(76) Inventors: Matthew Leberfinger, 309 Beech Ave., Altoona, PA (US) 16601; Timothy Montgomery, 3819 Beal Ave., Altoona, PA (US) 16601

( * ) Notice: Subject to any disclaimer, the term of this patent is extended or adjusted under 35 U.S.C. 154(b) by 188 days.

(21) Appl. No.: 11/001,816

(22) Filed: Dec. 2, 2004

(65) Prior Publication Data

US 2006/0090620 A1    May 4, 2006

Related U.S. Application Data

(60) Provisional application No. 60/624,021, filed on Nov. 1, 2004.

(51) Int. Cl.
B25H 1/00    (2006.01)
(52) U.S. Cl. .................. 144/286.1; 248/165; 248/439; 182/181.1
(58) Field of Classification Search ............. 144/286.1, 144/286.5, 287; 83/471, 471.2; 248/165, 248/439, 436; 182/181.1–186.5, 153; 108/55.3, 108/69
See application file for complete search history.

(56) References Cited

U.S. PATENT DOCUMENTS

| | | | |
|---|---|---|---|
| 1,225,981 A * | 5/1917 | Louughridge ............. | 182/181.1 |
| 1,925,383 A * | 9/1933 | Hickey ..................... | 266/57 |
| 2,110,718 A * | 3/1938 | Shiley ...................... | 182/181.1 |
| 2,662,566 A * | 12/1953 | Kurschner ................ | 144/286.5 |
| 2,989,142 A * | 6/1961 | Gill .......................... | 182/224 |
| 3,057,240 A * | 10/1962 | De Witt ................... | 83/412 |
| 3,091,900 A * | 6/1963 | Whittenberg .............. | 451/397 |
| 3,852,917 A | 12/1974 | McKown | |
| 4,252,239 A | 2/1981 | Snyder | |
| 4,531,441 A | 7/1985 | Bergler | |
| 4,549,455 A | 10/1985 | Perilloux, Jr. | |
| 4,969,496 A | 11/1990 | Romans | |
| 5,007,502 A * | 4/1991 | Shapiro ..................... | 182/181.1 |
| 5,193,598 A | 3/1993 | Estrem | |
| 5,526,856 A * | 6/1996 | Pedri ......................... | 144/287 |
| RE35,627 E | 10/1997 | Estrem | |
| 5,797,307 A | 8/1998 | Horton | |
| 5,836,365 A * | 11/1998 | Derecktor ................. | 144/287 |
| 6,155,318 A | 12/2000 | Underwood | |
| 6,240,987 B1 * | 6/2001 | Birkeland ................. | 144/286.1 |
| 6,786,301 B1 * | 9/2004 | Nesburg et al. .......... | 182/185.1 |
| 2003/0097920 A1 | 5/2003 | Ransom et al. | |
| 2005/0218577 A1 * | 10/2005 | Kent ......................... | 269/139 |

FOREIGN PATENT DOCUMENTS

| | | | | |
|---|---|---|---|---|
| EP | 000057654 | * | 8/1982 | .............. 144/286.5 |
| EP | 0021448 | | 1/1983 | |

* cited by examiner

Primary Examiner—Stephen Choi
(74) Attorney, Agent, or Firm—McQuaide, Blasko, Fleming & Faulkner, Inc.

(57) ABSTRACT

A complete and portable tool for retaining round, square or other non-flat stock, especially pipes, in a secure fashion while cutting and related operations are performed thereon. The portable pipe cutting tool includes an adjustable work support, V-shaped trough, chain and tightening device, catch tray, left and right support arm bracket, mounting stand, and power tool having a base portion that, as a unit, secure the pipe in place while being cut, grooved or otherwise worked on, by an operator. The portable pipe cutting tool prevents sideways, upward, rotational or other movement of the pipe during such operations.

12 Claims, 4 Drawing Sheets

PORTABLE PIPE CUTTING APPARATUS

RELATED APPLICATIONS

This application claims priority to U.S. Provisional Patent Application No. 60/624,021 filed Nov. 1, 2004.

FIELD OF THE INVENTION

The invention relates to a portable apparatus for securely retaining a non-flat workpiece, especially a pipe, while cutting and related operations are performed on the workpiece.

BACKGROUND OF THE INVENTION

Pipe used in the construction industry is normally welded or cut prior to installation. Existing methods for cutting pipe utilize a saw and vise arrangement. At construction sites, or other locations where there is no suitable work surface, it is common for operators to locate the saw and vise directly on the ground or on sheets of wood which are supported, for example, by concrete blocks. This arrangement requires that the operator crawl or kneel down on the ground in order to cut the pipe, which in most cases, consists of dirt, concrete, shale or mud. On a typical work day, an operator performs an average of 60–100 cutting and other operations, requiring the operator to kneel to the ground a corresponding number of times to complete each task. It can be appreciated that over the course of a given work day, the operator experiences significant bodily strain due to the uncomfortable height of the saw and vise.

A further shortcoming of the saw and vise arrangement is that it is unsafe for the operator. The vise features two flat metal jaws that squeeze the pipe on opposite sides thereof. The vise is suitable for securing flat workpieces while cutting operations are performed thereon. However, the vise is unable to retain round stock securely in place. As a result, these materials often break free of the vise, causing serious injury to the operator or damage to the cutting blade. This occurs more frequently during the colder months, when pipe tends to be brittle. In addition, the flat design of the vise often fails to accomplish the precise cutting that is required for pipe fitting operations.

Another shortcoming of existing saw and vise arrangements is that for lengthy workpieces, such as pipe, the work surface must be sufficiently long to adequately support the ends of the workpiece. However, the base portions of saws used in the art are only about 12 to 14 inches in length, which is inadequate for supporting large pipe, being defined herein as pipe having lengths of 15 inches or greater. As a result, the ends of the pipe are difficult to support and frequently sag on the dirt, concrete, shale or mud surfaces.

A variety of systems have been presented for overcoming the shortcomings of the prior art. U.S. Pat. No. 3,852,917 to McKown discloses two (2) four-legged solid stands adjoined to a work deck with a pipe grooving tool for releasably supporting a large pipe. The apparatus is not designed for supporting a small pipe, defined herein as having an outer diameter of 5 inches or less. Moreover, in order for a complete cross-section of the pipe to be cut, McKown requires that the pipe be rolled or rotated while it is being cut, posing a hazard to an operator. The apparatus is not suitable for supporting small, round stock in a tight and secure fashion. McKown further requires the use of a leveling device on each leg of the apparatus in order to balance the apparatus on uneven ground so that a pipe can be cut.

U.S. Pat. No. 5,193,598 to Estrem discloses a portable support stand that is attachable to a saw horse for supporting a power tool. The support stand includes a flat surface for supporting a workpiece but does not provide means for steadily and fixedly securing round workpieces, such as pipe, and does not include an integral cutting device.

Accordingly, there is a need for a portable and safe device for tightly securing pipe and other lengthy, non-flat workpieces, while cutting operations are performed thereon.

SUMMARY OF THE INVENTION

The present invention comprises a complete and portable power tool for retaining round and other non-flat stock, especially small diameter pipe, in a secure fashion while cutting and related operations are performed thereon. The portable pipe cutting apparatus includes an adjustable work support, V-shaped trough, chain and tightening device, catch tray, left and right support arm bracket, mounting stand, and power tool having a base portion that, as a unit, secure the pipe in place while it is being cut, or otherwise worked on, by an operator. The apparatus prevents sideways, upward, rotational or other movement of the pipe during such operations. Because pipe and other workpieces are tightly retained by the invention, the risk of injury to the operator and/or damage to a cutting blade is substantially diminished. Moreover, the invention reduces the need for bending, squatting and kneeling during a cutting operation so that an operator experiences significantly less muscle strain.

DETAILED DESCRIPTION OF THE INVENTION

Figure 1:
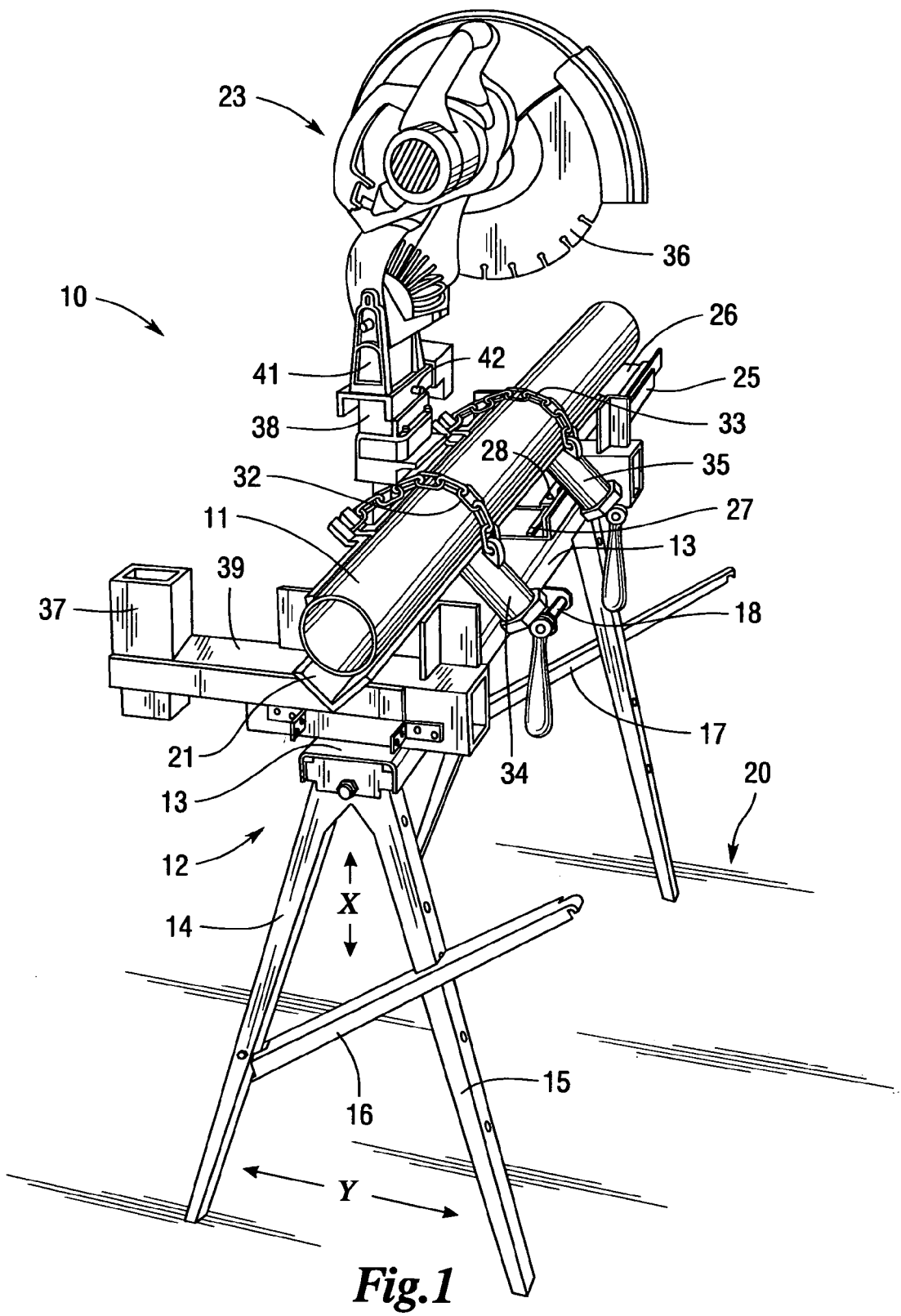
FIG. 1 is a perspective view of a portable pipe cutting apparatus showing a pipe supported thereon.

In accordance with the present invention, there is provided a portable apparatus for steadily supporting a workpiece, especially a pipe 11, while allowing cutting and related operations to be performed on the workpiece. As illustrated in FIG. 1, the portable pipe cutting apparatus 10 includes a collapsible metal work support 12 having a generally flat, horizontal member 13 and a first and second pair of legs 14, 15 attached to each end of the horizontal member 13. Each pair of legs is adjustably engaged by means of a screw or other fastener that is capable of releasably retaining the legs in the desired position. The underside of the horizontal member is hollow for receiving respectively said pairs of legs 14 and 15 for transport.

To achieve the operational position, each pair of legs 14 and 15 is respectively extended outwardly, away from the horizontal member 13, along axis "X", to a full vertical position. Next, each pair of legs 14, 15 is extended outwardly, along horizontal axis "Y", such that the legs of each pair are respectively moved in an opposite direction to the counterpart leg. The legs 14, 15 are locked into an operational position for tightly securing a pipe 11 or other workpiece to be cut by means of a screw or other tightening device. Preferably, the operational position places the workpiece approximately 29"–36" above the floor or ground 20, which is a very comfortable working height.

According to the invention, the portable pipe cutting apparatus 10 can be erected on an uneven floor or ground 20 by simply erecting the apparatus 10 on the uneven surface, as described above, laying the workpiece within the V-shaped trough 21, and securing the chain device 22 around the workpiece. In this fashion, an electric saw 23 will achieve a perfectly straight cut through a complete cross section of the workpiece. The invention enables a workpiece to be precisely cut on any type of ground or floor surface 20 without the need to use a leveling device to stabilize the apparatus 10, as required by designs of the prior art. Notably, the present invention can be erected for use on any type of surface 20 in under two minutes by simply raising or lowering the legs 14, 15 to an appropriate height and locking the legs into position by means of the tightening device.

For storage or transport, the legs of each pair 14, 15 are respectively moved inward, toward the counterpart leg, along horizontal axis "Y", so as to achieve a vertical, retracted position. Each pair of legs 14, 15 is then pivoted downward, toward the horizontal member 13, along axis "X". In this way, a fully retracted position within the hollow underside of the horizontal member 13 is achieved. A transport handle 18 is welded or otherwise secured to a sidewall of the horizontal member to allow the apparatus 10, in its compacted form, to be conveniently transported by an operator. Preferably, the transport handle 18 is centered relative to the front sidewall so that the compacted apparatus 10 is suitably balanced for greater ease in transport.

An extended brace 16, 17 is attached across each pair of legs 14, 15 for imparting stability to the apparatus 10 and providing storage for construction and building materials such as pipe 11. A stop pin is bolted, or otherwise fastened, to each pair of legs 14, 15, allowing the cross brace 16, 17 to be suitably raised or lowered to receive different sizes of pipe 11. In this way, various lengths of pipe 11 can be stocked on the apparatus 10 to be cut and used as desired. The collapsible work support 12 is preferably constructed of metal, having a cross-section dimension of about 3½"×38". However, it will be appreciated that the work support 12 can be constructed of a variety of materials and be of different sizes.

Mounted lengthwise atop the horizontal member 13, and generally coincident with the width thereof, is a support channel 25 that permits an elongated tray 26 to slide outward relative to the horizontal member 13, so as to assume an extended position along the axis "Z". When in the extended position, the catch tray 26 projects outward from the horizontal member 13 so as to be located immediately beneath at least a portion of the workpiece while operations are performed thereon. In this way, the tray 26 captures sections of the workpiece as they are severed by an operator and prevents the severed portions from falling to the floor or ground 20. A lower surface of the catch tray 26 is engaged with raised surfaces (e.g. tracks) 27 of the support channel 25 to facilitate slidable movement of the catch tray 26 relative to the horizontal member. Small pins or other securing means 28 protrude from the lower surface of the catch tray 26 for retaining the catch tray in the desired position. The catch tray 26 can be slid outward at either end of the horizontal member to support left handed and/or right handed usage of the portable pipe cutting apparatus 10 by an operator.

In a preferred embodiment, the catch tray 26 is formed of metal and has a cross section dimension of about 32"×3½" and a depth of about 1½". The catch tray 26 is preferably disposed approximately 30" above the floor or ground 20, which is a very comfortable working height. While the catch tray 26 can be constructed of a variety of materials and be of different sizes, the foregoing dimensions advantageously allow the catch tray to capture sections of cut pipe 11 up to about 40" in length. This feature is of particular importance to the present invention as it enables the operator to retrieve cut pipe 11 at a comfortable level without having to bend or kneel down to pick cut pipe off the floor or ground 20.

Of principal importance to the invention is an immovable trough 21 that is welded or otherwise mounted along the length of the horizontal member 13, above the level of the catch tray 26. The trough 21 is generally V-shaped and is preferably constructed of a single continuous piece of material (e.g. steel or other metal). An upper surface of the V-trough 21 is used to steadily support a workpiece and maintain the workpiece in a fixed spatial relationship relative to the power tool 23, as illustrated in FIG. 1. Because the V-trough 21 is generally coincident with the horizontal member 13 of the portable pipe cutting apparatus 10, sufficient lateral and horizontal support is provided for even extremely long workpieces such as pipe 11. Although the V-trough 21 can be used for holding generally secure stock, its design is uniquely configured for supporting round and other non-flat workpieces in a secure and steady fashion. Such non-flat workpieces may include, for example, steel, cast iron, concrete and plastic pipe 11, square stock, Unistrut, and other construction materials. The invention is particularly useful for securing materials having diameters of 5" or less.

Figure 2:
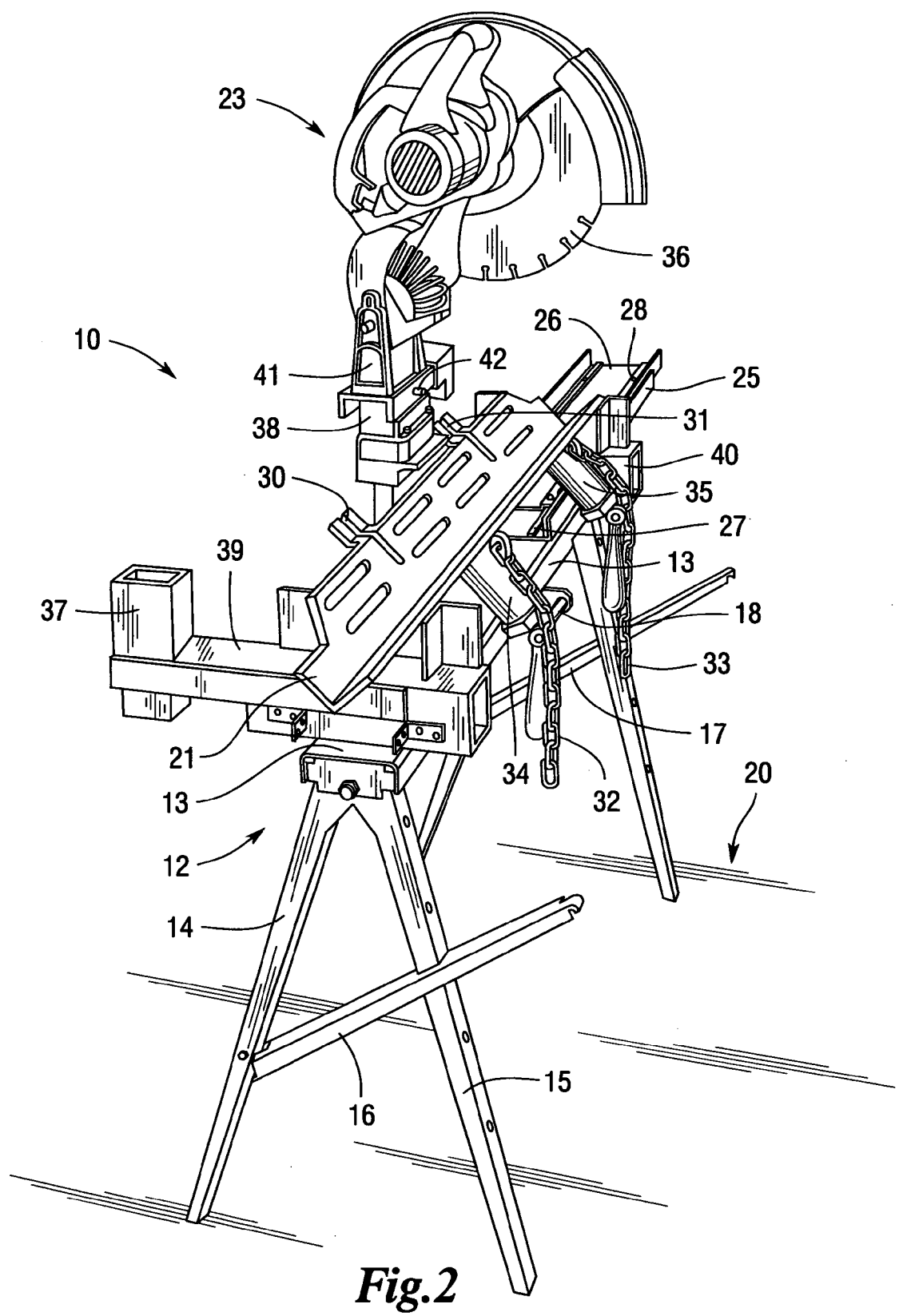
FIG. 2 is a perspective view of a portable pipe cutting apparatus according to the invention.

As shown in FIG. 2, slots 30, 31 are provided in the V-trough 21 for respectively receiving a roller chain 32, 33 which extends over the top of the workpiece. Each chain 32, 33 is connected to a turnbuckle or similar swivel handle 34, 35 fixedly mounted to the trough 21. In operation, the turnbuckle 34, 35 is rotated so that the chain 32, 33 is tightened sufficiently around the workpiece. The novel design of the V-trough 21, together with the tightening chain device, prevents a pipe 11 from rolling, rotating, pinching, shifting upward or otherwise moving while the pipe 11 is being cut by an operator. As a result, the pipe 11 is held tightly within the trough 21 so that the material cannot break free and cause injury to the operator and/or damage to a cutting blade 36.

Figure 3:
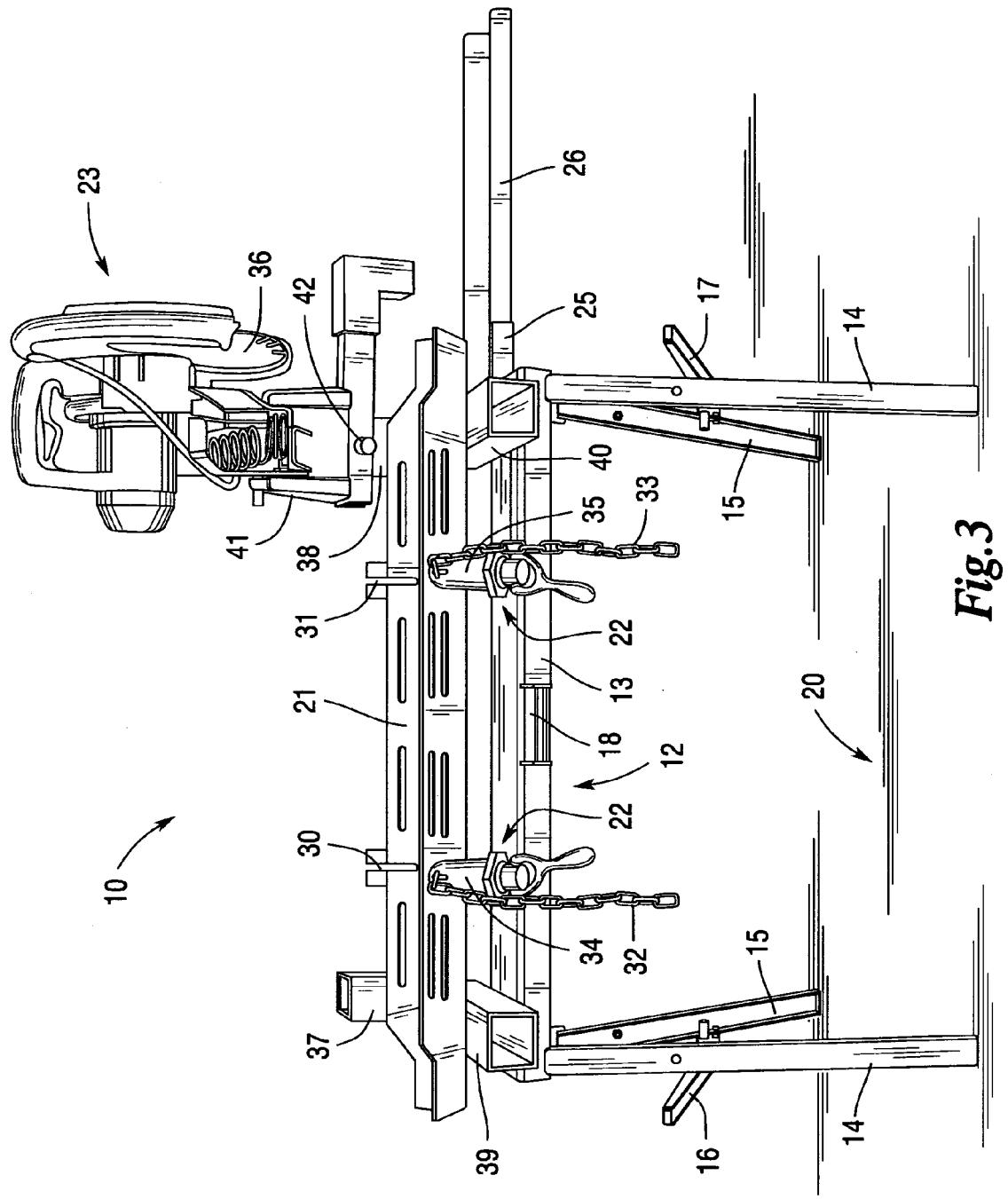
FIG. 3 is a side view of a portable pipe cutting apparatus showing the components thereof.
Figure 4:
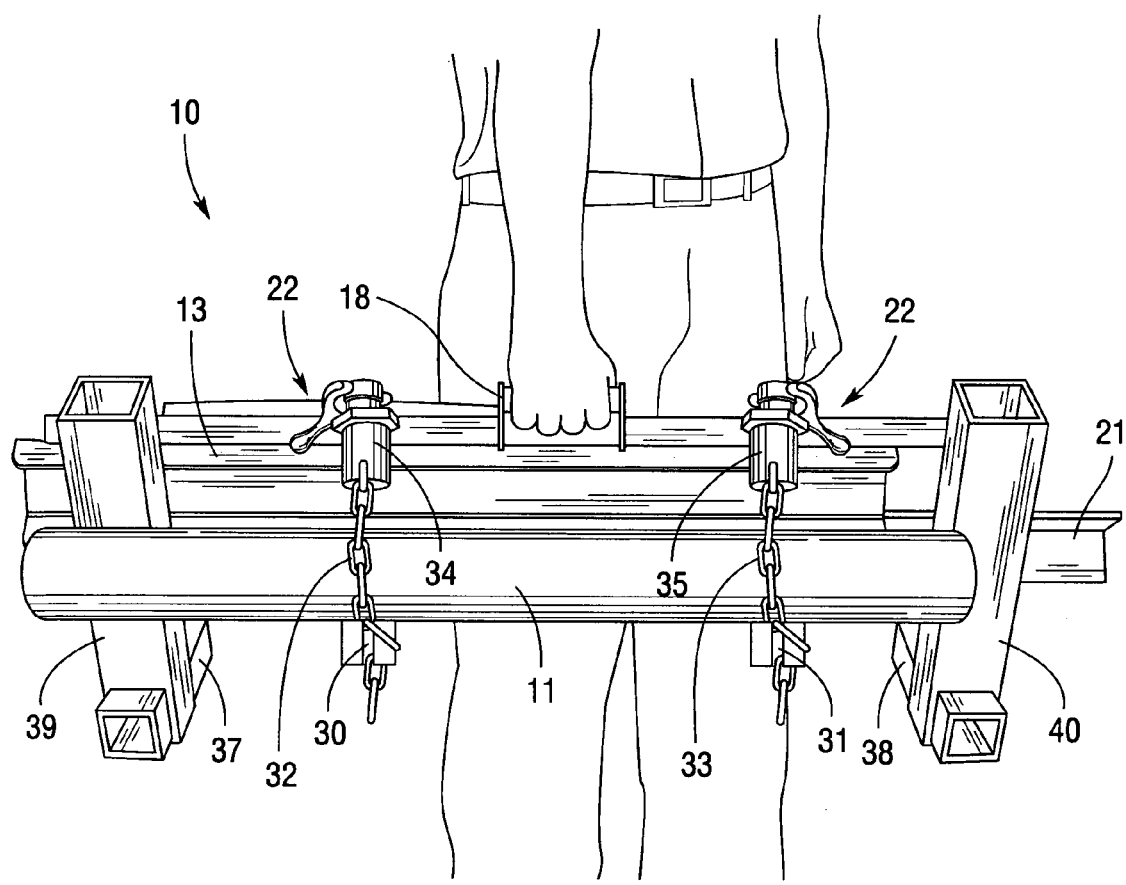
FIG. 4 shows a portable pipe cutting apparatus in its compacted form being transported by an operator.

As shown in FIG. 3, a left support arm bracket 37 and right support arm bracket 38 are mounted to the horizontal member 13 of the pipe cutting apparatus 10, on the level of the catch tray 26. In operation, the left and right support arm brackets 37, 38 are fixed in an extended position, perpendicular to the horizontal member 13. End portions of the left and right support arm brackets 37, 38, respectively, are provided with an upright mounting stand 39, 40 for releasably securing the cutting tool in a desired position above the level of the V-trough 21 for right or left handed cutting. The left and right mounting stands 39, 40 each have an opening or female portion for receiving a male base section 41 fitted onto the bottom of the power tool. A steel pin or other securing means 42 is used to lock the power tool into the mounting stand 39, 40. The steel pin 42 is introduced through a small aperture in the mounting stand 39, 40 so as to extend through the base section 41 of the power tool and the support arm bracket 37, 38.

The power tool comprises an electric saw 23 with a round wheel for performing cutting, grinding or welding operations on a workpiece, especially a pipe 11. To operate the portable pipe cutting apparatus 10 of the present invention, an operator positions the base section 41 of the saw in the mounting stand 39, 40 of the left or right support arm bracket 37, 38, according to whether the operator is left or right handed. This universal mount feature avoids a number of operator related hazards. The power tool is locked into place by means of a steel pin or other locking means 42. As mounted, the power tool is situated at a comfortable operating height, above the level of the V-trough 21 that is used to steadily support the pipe 11 or other workpiece. The catch tray 26 is drawn outward with respect to the horizontal member 13.

A pipe 11 is laid lengthwise within the V-trough 21 so that a section of pipe 11 to be cut, ground etc. projects over the extended catch tray 26 positioned immediately below the trough 21. Once the pipe 11 is suitably positioned, roller chains 32, 33 are placed over the upper surface of the pipe. End portions of the roller chains 32, 33 are interposed through their respective slots 30, 31 in the V-trough 21. The swivel handle 34, 35 connected to each roller chain 32, 33 is turned so that the chains are tightly secured around the pipe 11 to prevent sideways, upward, rotational or other movement of the pipe while operations are being performed thereon. As the operator lowers the power tool 23 in the direction of the rigidly secured pipe 11, a complete cross-sectional cut is made. The cut pipe 11 drops directly into the catch tray 26 for easy retrieval by the operator. If desired, the catch tray 26 may remain retracted so that severed pipe 11 is allowed to fall freely to the ground 20. Use of the catch tray 26 is preferred, however, to prevent cut pipe 11 from being stained with mud, concrete, shale or other substances present on the floor or ground 20. Furthermore, the catch tray 26 spares the operator from having to bend or stoop to the ground 20 to retrieve cut materials.

According to the invention, a saw cutting blade 36 is able to travel about ¼" below the level of the V-trough 21, allowing the cutting blade 36 to make a complete cut through the cross section of any material held within the trough 21. The cutting blade 36 does not engage the catch tray 26, which is located approximately 1½" below the V-trough 21. This configuration allows a complete cross section of pipe 11 to be evenly cut by an operator in a single stroke, without the need for rotation of the pipe. As a result, cutting and related tasks can be accomplished both accurately and quickly, a significant economic benefit. It will be appreciated that the invention avoids the operating dangers associated with rotating a pipe 11 while simultaneously cutting the pipe 11. Such operating dangers include "pinching," whereby the pipe 11 being cut constricts the cutting blade 36, or "popping", whereby a round, square or other non-flat workpiece being cut breaks free (pops out) of the flat retaining means in which the non-flat workpiece is held. Both of these occurrences may result in serious injury to the operator and/or damage to the cutting blade 36. Such occurrences are more frequent during the cold months when pipe 11 tends to be brittle and more difficult to cut.

In addition to improving the overall safety of a pipe 11 cutting operation, the invention provides significant ergonomic benefits to an operator. First, pipe 11 and other construction materials are stocked on the extended cross braces 16, 17 of the cutting apparatus 10 so that the materials can be easily accessed. In addition, the V-trough 21, which is the primary work surface of the invention, and the catch tray 26 are located approximately 29"–36" above the floor or ground 20. This allows an operator to accurately measure, cut and subsequently retrieve, one or more sections of pipe 11 at a comfortable working height without having to bend, stoop or kneel during the process. This ergonomic working height contributes greatly to operator satisfaction and productivity. As such, the invention is beneficial to the operator and business owner alike The portable pipe cutting apparatus 10 of the present invention is specially designed for retaining round, square and other non-flat stock in a secure fashion. Pipe 11 is unable to rotate, or otherwise move, while cutting, grinding and other operations are performed thereon. Because pipe 11 and other workpieces are tightly retained within the V-shaped trough 21, the risk of injury to an operator and/or damage to a cutting blade 36 is substantially diminished. Moreover, the operator experiences significantly less muscle strain due to the tremendous reduction in bending, squatting and kneeling.

While the invention has been particularly shown and described with reference to preferred embodiments thereof, it will be understood by those skilled in the art that various alterations in form and detail may be made therein without departing from the spirit and scope of the invention. Moreover, the foregoing parameters can vary considerably and are not limited by the preferred embodiments described herein as depicted in the Figures.

What is claimed is:

1. A portable apparatus for securely retaining a workpiece while operations are performed thereon, comprising:
   (a) a support frame including an elongated upper horizontal member and a first and second pair of adjustable and foldable legs disposed in spaced relationship to each other and mounted to opposite ends of the horizontal member;
   (b) an elongated tray slidably mounted on top of said horizontal member and being moveable between an extended and a retracted position, wherein in the extended position said tray projects outward from said horizontal member so as to be located immediately beneath at least a segment of the workpiece while operations are performed thereon for capturing severed segments of said workpiece and preventing said severed segments from contacting the floor or ground;
   (c) a V-shaped, immovable platform mounted to the horizontal member above said slidable tray for steadily retaining said workpiece and preventing rolling thereof, a segment of workpiece to be operated on projecting above at least a portion of said slidable tray; and
   (d) a left and right mounting stand for releasably attaching a power tool, each mounting stand including a bracket for securing the stand to the top surface of the support frame.

2. The portable apparatus of claim 1 further comprising an adjustable tightening device connected to said support frame and releasably extending about said workpiece for fixedly securing said workpiece within the V-shaped platform.

3. The portable apparatus of claim 1 further comprising a brace attached across said first and second pair of legs for storing construction and building materials.

4. The portable apparatus of claim 1 further comprising said power tool having a base for secure and releasable mounting to said left and right mounting stand, respectively.

5. The portable apparatus of claim 1 wherein said power tool comprises an electric saw.

6. The portable apparatus of claim 1 further comprising a handle for carrying the apparatus when the apparatus is in a compacted position.

7. A portable apparatus for securely retaining a pipe while operations are performed thereon, comprising:
(a) a support frame including an elongated upper horizontal member and a first and second pair of adjustable and foldable legs disposed in spaced relationship to each other and mounted to opposite ends of the horizontal member;
(b) an elongated tray slidably mounted on top of said horizontal member and being moveable between an extended and a retracted position, wherein in the extended position said tray projects outward from said horizontal member so as to be located immediately beneath at least a segment of the pipe while operations are performed thereon for capturing severed segments of said pipe and preventing said severed segments from contacting the floor or ground;
(c) a V-shaped, immovable platform mounted to the horizontal member above said slidable tray for steadily retaining said pipe and preventing rolling thereof, a segment of pipe to be operated on projecting above at least a portion of said slidable tray; and
(d) a left and right mounting stand for releasably attaching a power tool, each mounting stand including a bracket for securing the stand to the top surface of the support frame.

8. The portable apparatus of claim 7 further comprising an adjustable tightening device connected to said support frame and releasably extending about said pipe for fixedly securing said pipe within the V-shaped platform.

9. The portable apparatus of claim 7 further comprising a brace attached across said first and second pair of legs for storing construction and building materials.

10. The portable apparatus of claim 7 further comprising said power tool having a base for secure and releasable mounting to said left and right mounting stand, respectively.

11. The portable apparatus of claim 7 wherein said power tool comprises an electric saw.

12. The portable apparatus of claim 7 further comprising a handle for carrying the apparatus when the apparatus is in a compacted position.

* * * * *